(12) United States Patent
Vannice et al.

(10) Patent No.: US 9,079,680 B2
(45) Date of Patent: Jul. 14, 2015

(54) STRAP REMOVAL SYSTEM

(75) Inventors: Jeff G. Vannice, Beaver Dam, WI (US); John K. Knechtel, Ripon, WI (US); Robert A. Gabel, Jr., Beaver Dam, WI (US)

(73) Assignee: Busse/SJI Corporation, Randolph, WI (US)

( * ) Notice: Subject to any disclaimer, the term of this patent is extended or adjusted under 35 U.S.C. 154(b) by 1394 days.

(21) Appl. No.: 12/441,463

(22) PCT Filed: Dec. 6, 2007

(86) PCT No.: PCT/US2007/082703
§ 371 (c)(1),
(2), (4) Date: Aug. 21, 2009

(87) PCT Pub. No.: WO2008/052175
PCT Pub. Date: May 2, 2008

(65) Prior Publication Data
US 2010/0024188 A1    Feb. 4, 2010

Related U.S. Application Data

(60) Provisional application No. 60/854,988, filed on Oct. 27, 2006.

(51) Int. Cl.
*B65B 69/00* (2006.01)
*B65H 54/71* (2006.01)
*B23D 53/02* (2006.01)
(Continued)

(52) U.S. Cl.
CPC ......... *B65B 69/0025* (2013.01); *B25J 11/0055* (2013.01); *B65B 69/0033* (2013.01); *B65H 54/71* (2013.01); *Y10T 29/49819* (2013.01); *Y10T 29/53991* (2013.01)

(58) Field of Classification Search
CPC   B65B 69/0025; B65B 69/0033; B65H 54/71; B08B 9/083; B23P 19/025; B23D 53/02
USPC ............ 29/426.3, 426.1, 426.4, 564.1, 564.3, 29/566.1; 83/909
See application file for complete search history.

(56) References Cited

U.S. PATENT DOCUMENTS 3,648,739 A * 3/1972 Angarola ...................... 140/93.2
3,674,972 A * 7/1972 Stahnke .......................... 219/56
(Continued)

FOREIGN PATENT DOCUMENTS

GB         2076355 A  * 12/1981  .............. B65B 69/00

OTHER PUBLICATIONS

Merriam-Webster online dictionary; Oct. 31, 2013; http://www.merriam-webster.com/dictionary/engagement; p. 1.*

Primary Examiner — David Bryant
Assistant Examiner — Bayan Salone
(74) Attorney, Agent, or Firm — Boyle Fredrickson, S.C.

(57) ABSTRACT

The invention provides a strap removal system and a method of removing straps from a load on a conveyor. The method includes providing an end effector to the side of the conveyor and moving the end effector adjacent a first vertical side of the load. A first strap is detected while moving the end effector across the first vertical side of the load. The first strap is engaged. The first strap is pulled away from the first vertical side of the load while engaged. The first strap is cut at a cut point on the first strap, and the first strap is removed from the load.

18 Claims, 13 Drawing Sheets

(51) Int. Cl.
*B08B 9/08* (2006.01)
*B23P 19/02* (2006.01)
*B25J 11/00* (2006.01)

(56) References Cited

U.S. PATENT DOCUMENTS

| | | | |
|---|---|---|---|
| 4,095,078 A * | 6/1978 | Waenerlund et al. | 219/68 |
| 4,173,311 A * | 11/1979 | Lucke | 242/472.4 |
| 4,328,609 A * | 5/1982 | Born | 29/564.3 |
| 4,404,723 A * | 9/1983 | Ohba et al. | 29/33.52 |
| 4,437,223 A * | 3/1984 | Petros | 29/564.3 |
| 4,593,452 A * | 6/1986 | Keahey et al. | 29/564.6 |
| 4,638,701 A * | 1/1987 | Oberlander et al. | 83/490 |
| 4,773,148 A * | 9/1988 | Ohya et al. | 29/426.4 |
| 4,835,836 A * | 6/1989 | van Uitert | 29/564.3 |
| 4,838,751 A * | 6/1989 | Hanaya et al. | 414/412 |
| 4,841,619 A * | 6/1989 | Theriault | 29/426.3 |
| 4,976,583 A * | 12/1990 | Moltrasio | 414/810 |
| 4,995,784 A * | 2/1991 | Boisseau | 414/810 |
| 5,006,385 A * | 4/1991 | Cheung et al. | 428/57 |
| 5,044,937 A * | 9/1991 | Lisa | 432/5 |
| 5,087,306 A * | 2/1992 | Cheung et al. | 156/73.5 |
| 5,091,039 A * | 2/1992 | Ujimoto et al. | 156/519 |
| 5,156,516 A * | 10/1992 | Boisseau | 414/412 |
| 5,163,216 A * | 11/1992 | Ercums et al. | 29/564.3 |
| 5,179,878 A * | 1/1993 | Kranefeld et al. | 83/13 |
| 5,190,430 A * | 3/1993 | Neri et al. | 414/412 |
| 5,241,743 A * | 9/1993 | Hubbs et al. | 29/775 |
| 5,297,329 A * | 3/1994 | Santin et al. | 29/564.3 |
| 5,371,938 A * | 12/1994 | Martin | 29/564.3 |
| 5,400,493 A * | 3/1995 | Hall | 29/426.4 |
| 5,448,876 A * | 9/1995 | Menayan | 53/399 |
| 5,495,704 A * | 3/1996 | Menayan | 53/399 |
| 5,970,834 A * | 10/1999 | Garofano et al. | 83/90 |
| 6,115,904 A * | 9/2000 | Merrill et al. | 29/426.4 |
| 6,401,582 B1 * | 6/2002 | Noe et al. | 83/176 |
| 6,912,762 B2 * | 7/2005 | Lile et al. | 29/33.52 |
| 6,986,233 B1 * | 1/2006 | Covington et al. | 53/381.2 |
| 7,849,776 B2 * | 12/2010 | Hilgendorf | 83/495 |
| 8,365,389 B2 * | 2/2013 | Taylor | 29/564.3 |
| 2007/0044603 A1 * | 3/2007 | Scholtes et al. | 83/13 |

* cited by examiner

STRAP REMOVAL SYSTEM

CROSS-REFERENCE TO RELATED APPLICATIONS

This application claims the benefit of prior filed U.S. Provisional Application No. 60/854,988, filed on Oct. 27, 2006, the entire contents of which are incorporated by reference.

BACKGROUND

The present invention relates to a strap removal system, or a de-bander machine, for removing straps from a palletized load.

Products and article containers are typically shipped on a pallet whereby straps, or bands, are used to secure, hold and stabilize a palletized load. The load may have a plurality of straps wrapped about a height and/or a width of the load. Once the load reaches its destination, the straps must be removed prior to further processing of the articles. In some situations, the straps are manually cut and removed from the load. Such a process is inefficient and time-consuming. Some de-bander machines are known for cutting and removing a strap from a load; however, such machines work from a top of the load and are limited by height constraints of other integrated depalletizing equipment. Further, current processes for removing the strap often result in damage to the load by the strap.

SUMMARY

In one embodiment, the invention provides a method of removing straps from a load on a conveyor. The method includes providing an end effector to the side of the conveyor and moving the end effector adjacent a first vertical side of the load. A first strap is detected while moving the end effector across the first vertical side of the load. The first strap is engaged. The first strap is pulled away from the first vertical side of the load while engaged. The first strap is cut at a cut point on the first strap, and the first strap is removed from the load.

In another embodiment, the invention provides an end effector for removing straps from a load on a conveyor. The end effector includes a main support member and a grip assembly coupled to the main support member. The grip assembly includes a suction unit, the suction unit movable relative to the main support member between an extended position adjacent a vertical side of the load and a retracted position remote from the vertical side of the load. The end effector further includes a clamp assembly coupled to the main support member and including a clamp block and a first clamp mechanism movable relative to the clamp block between an open position and a clamping position. A cutting assembly is coupled to the main support member and includes at least one movable cutting member, the cutting assembly being positioned vertically above the clamp assembly.

In yet another embodiment, the invention provides a strap removal system for removing straps from a load on a conveyor. The strap removal system includes an articulated arm robot movable relative to the load between at least a position remote from the load, a position adjacent a first vertical side of the load, and a position adjacent a second vertical side of the load. An end effector is coupled to the articulated arm robot, the end effector including a grip assembly, a clamp assembly, and a cutting assembly. A disposal system is positioned to receive a cut strap from the end effector.

In yet another embodiment, the invention provides a cutting assembly for cutting straps from a load on a conveyor, the cutting assembly including a mount plate coupled to a main support member, a first cutting member coupled to the mount plate and having a cutting edge for engaging a load strap, and a second cutting member coupled to the mount plate adjacent the first cutting member, the second cutting member being movable across the cutting edge of the first cutting member to sever the load strap.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
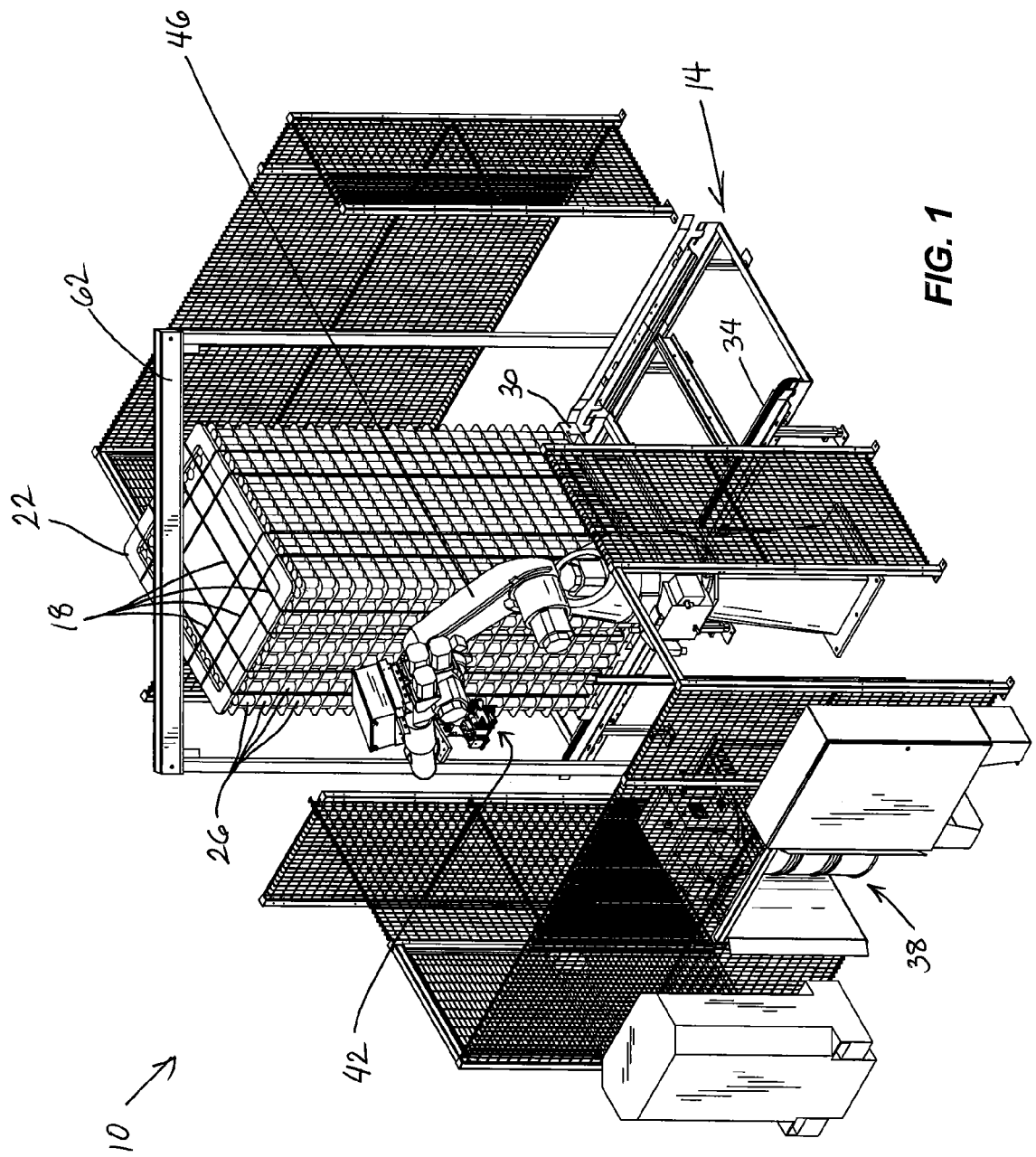
FIGS. 1-3 illustrate a strap removal system in use with a palletized load that is supported by a conveyor system.
Figure 2:
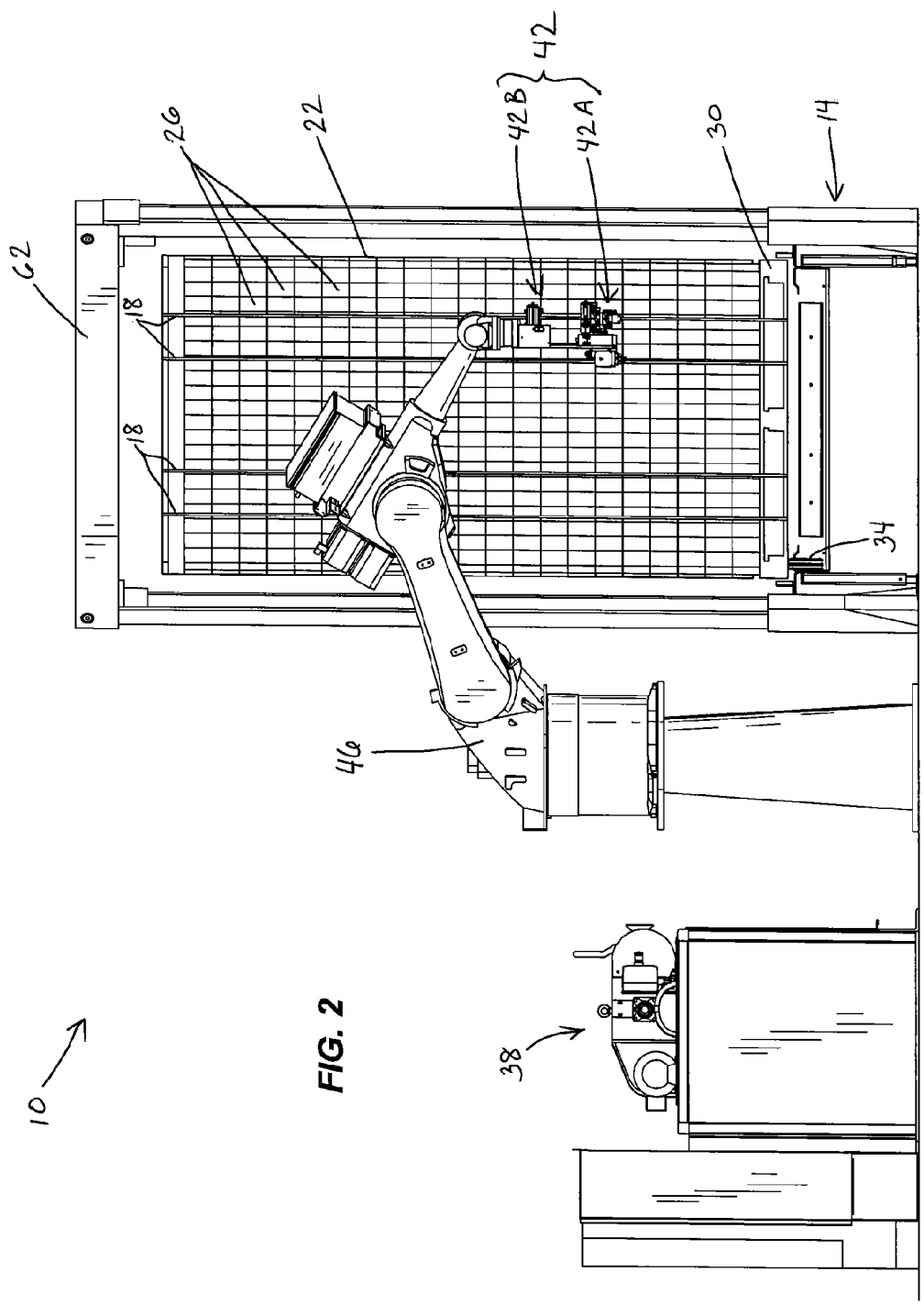
Figure 3:
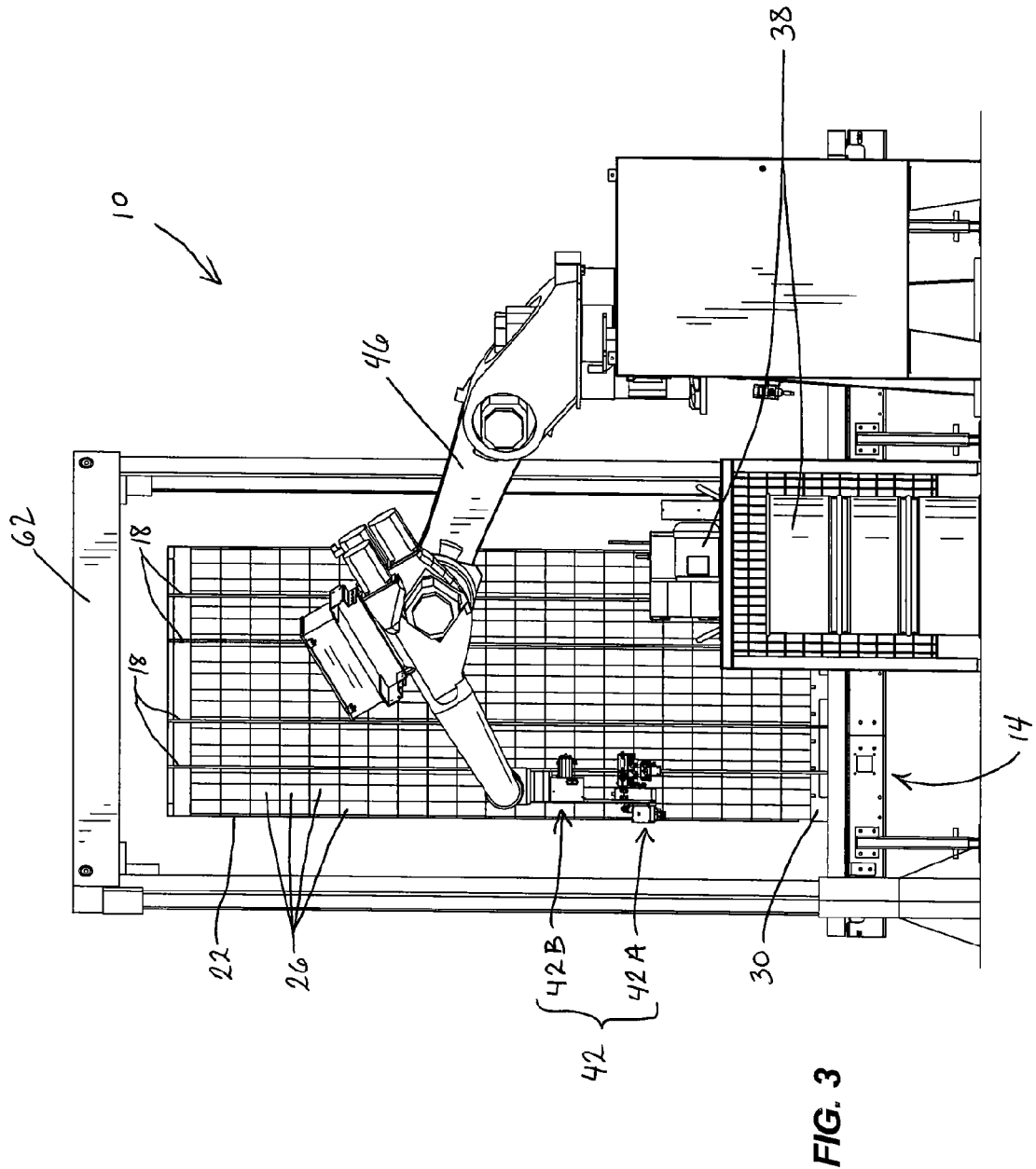

FIGS. 1-3 illustrate a strap removal system 10, or de-banding machine, used in conjunction with a conveyor system 14 to remove straps 18, or bands, from a palletized load 22 of articles 26. The load 22 of articles 26 is supported by a pallet 30, whereby straps 18 are used to secure and stabilize the load 22 on the pallet 30. Palletized loads 22 enter a facility for processing, for example, at a receiving station, and are positioned upon a conveyor 34 of the conveyor system 14. The strap removal system 10 cuts the straps 18, removes the straps 18 from the load 22, and feeds the straps 18 to a disposal system 38 as described in further detail below.

In the illustrated embodiment, the strap removal system 10 includes strap removal tooling in the form of an end effector 42 located at a free end of an articulated arm robot 46. The strap removal system 10 is positioned on a side of the conveyor 34 such that the end effector 42 is positionable proximate one or more substantially vertical sides of the palletized load 22. The end effector 42 includes a grip assembly 50, a clamp assembly 54 and a cutting assembly 58 to facilitate cutting and removal of the straps. As shown in FIGS. 1-3, a clamp mechanism 62 positioned above the conveyor 34 to clamp corners of the load 22 during strap removal and prevent the articles 26 from falling as pressure is released when the straps 18 are cut. Once a strap 18 is cut from the load 22, the end effector 42 transfers the strap 18 to the disposal system 38. The disposal system 38 may include a holding container, a cutter, and/or a shredder, although other known means for disposing of straps 18 may be used. The removed and/or chopped/shredded strap(s) 18 are eventually taken away for recycling or disposal.

Figure 4:
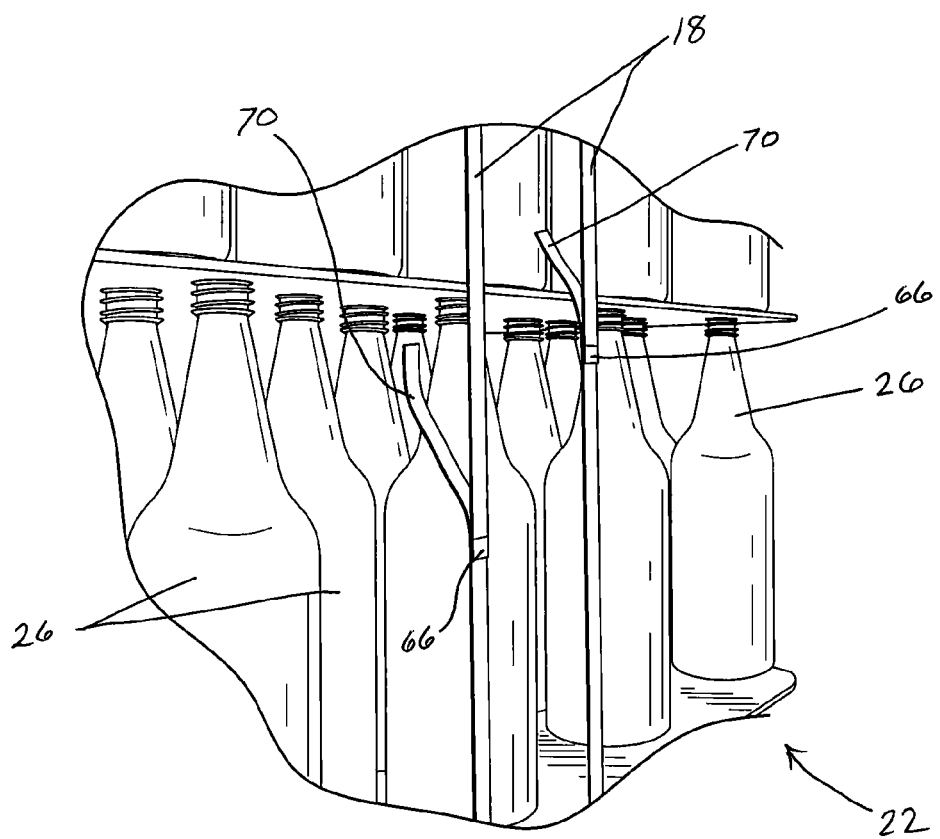
FIG. 4 illustrates the palletized load, including straps for containing the load on a pallet.

FIG. 4 illustrates two straps 18 wrapped about a height of the load 22, such that the straps 18 are substantially vertically oriented. Each strap 18 is formed from a length of plastic banding, or metal in some embodiments, having two ends bonded or welded (e.g., heat welded) together at a joint 66. In the illustrated embodiment, each strap 18 includes a free end 70 that forms a "tail" of the strap 18, wherein the tail 70 extends upwards away from the joint 66. The length of the tail 70 may vary between straps 18. Typically, the tail 70 extends upwardly on an interior side of the strap 18 closest to the load 22. As will be discussed below, in one embodiment, the end effector 42 grips the strap 18 above the joint 66 and cuts the strap 18 above the grip point such that the joint 66 is transferred to the disposal system 38 first. In another embodiment, when the strap 18 is cut on a side of the load 22 opposite the joint 66, the end effector 42 cuts the strap 18 and pulls the strap 18 off of the load 22 to the disposal system 38 such that the tail 70 follows the weld joint 66 across the load 22. Thereby, damage to the load 22, the articles 26, and cross-straps 18 (FIG. 1) is prevented.

FIGS. 5A-8 illustrate the end effector 42 of the strap removal system 10 according to one embodiment of the invention. The end effector 42 includes a main support member 74 rotatably coupled to the arm robot 46. The end effector 42 also includes a sensor 78 for locating a strap 18, the grip assembly 50, the clamp assembly 54, and the cutting assembly 58, all supported by the main support member 74. In the illustrated embodiment, the end effector 42 includes a lower portion 42A (FIGS. 7A and 7B) rotatable with respect to the main support member 74 and an upper portion 42B (FIG. 8) that is stationary with respect to the main support member 74. The sensor 78, the grip assembly 50 and the clamp assembly 54 form part of the lower portion 42A, while the cutting assembly 58 forms part of the upper portion 42B. Operation of the end effector 42 and the arm robot 46 is controlled by a controller (not shown), such as a PLC or other controller device, and the sensor 78. The controller commands the end effector 42 to perform a de-banding or strap removal process, as discussed below.

The lower portion 42A of the end effector 42 is rotatable relative to the main support member 74. In the illustrated embodiment, a rotory actuator 82 is coupled to the main support member 74 and a frame of the lower portion 42 is coupled to the rotary actuator 82. After the strap 18 is cut, the lower portion 42A is rotated approximately 90 degrees in order to feed a cut end 18A (FIG. 6) of the strap 18 to the disposal system 38. In a further embodiment, the lower portion 42A is rotated at other angles. Other components supported by the lower portion 42A of the end effector 42 include, but are not limited to, a pneumatic valve bank, a vacuum switch for a suction unit, and other sensors for position monitoring of the system.

The sensor 78 seeks and locates a strap 18 on the load 22 for cutting. In the illustrated embodiment, the sensor 78 is located on the lower portion 42A of the end effector 42 directly below the grip assembly 50. The sensor 78 is coupled to the grip assembly 50, or alternately, may be coupled to a separate mounting plate (not shown), which is coupled to another portion of the lower portion 42A. In one embodiment, the sensor 78 is a photocell and distance sensor that locates the strap 18 to initiate the removal process. One example of the photocell used in the strap removal system 10 is provided by Allen-Bradley (Milwaukee, Wis.). In further embodiments of the invention, other sensors and systems may be used to locate a strap 18, such as an ultrasonic sensor, a color detection sensor, a vision system (black and white or color), or other known detection systems.

Figure 5A:
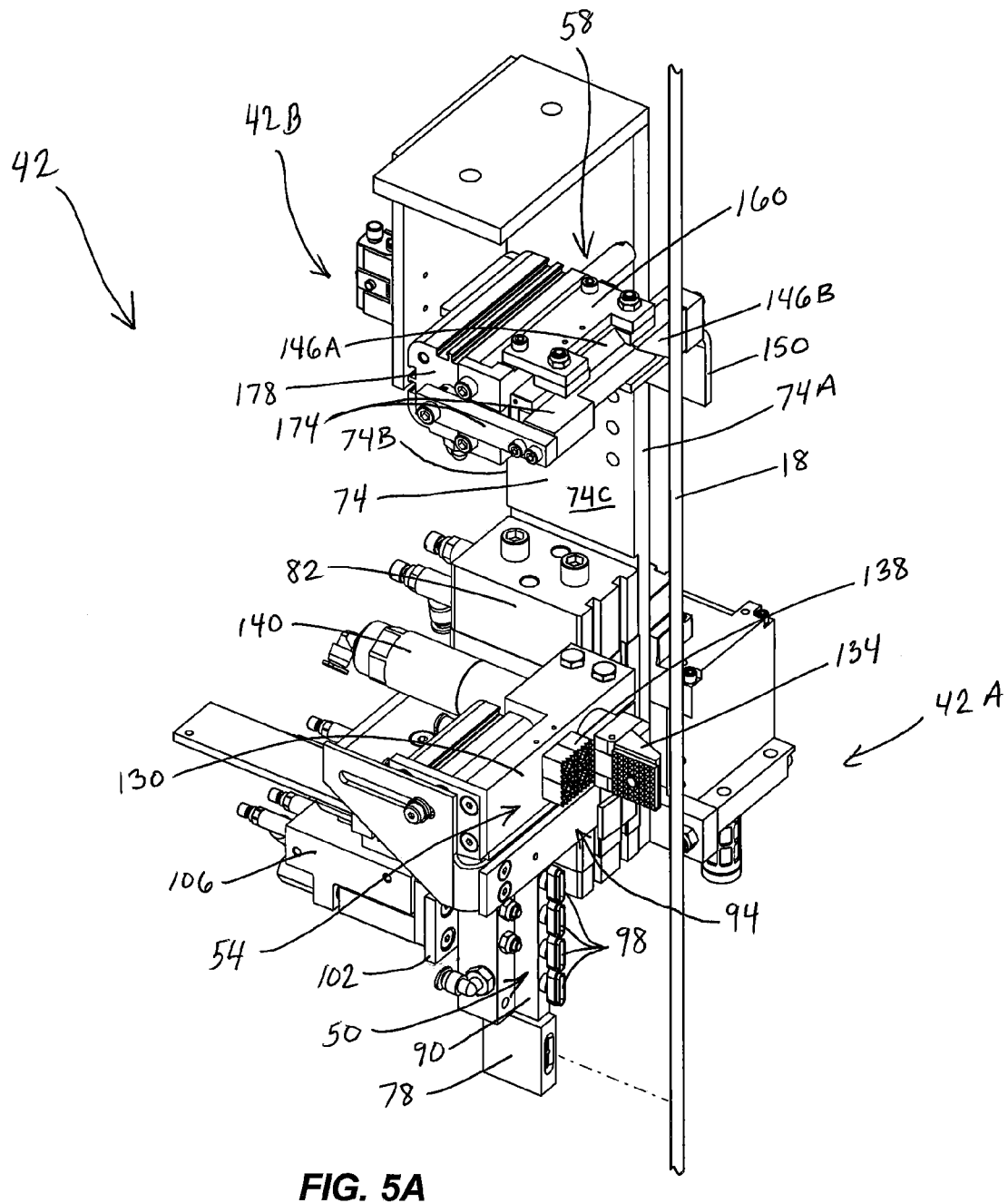
FIGS. 5A-5F illustrates various states of operation of an end effector according to one embodiment of the invention.
Figure 5B:
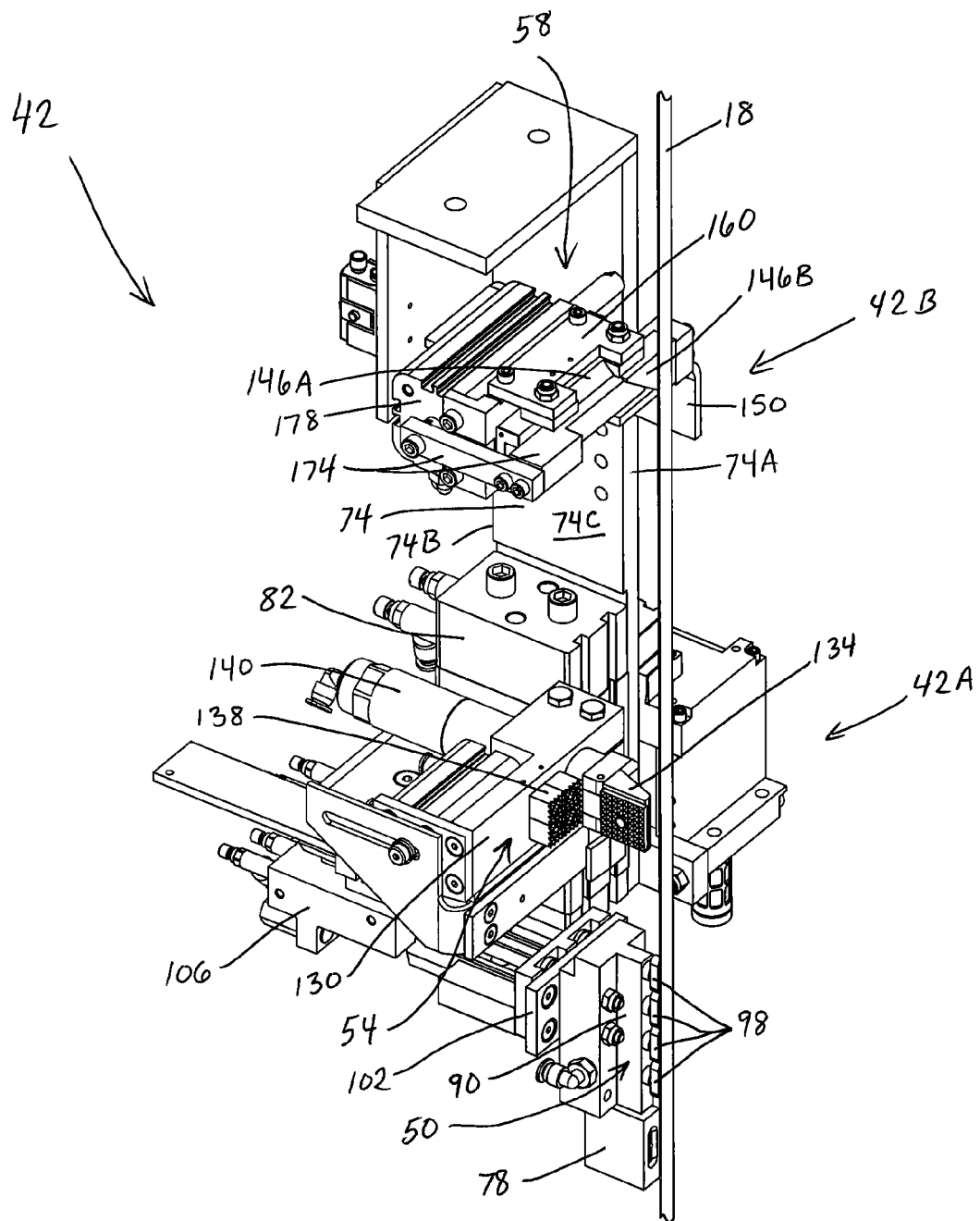
Figure 5C:
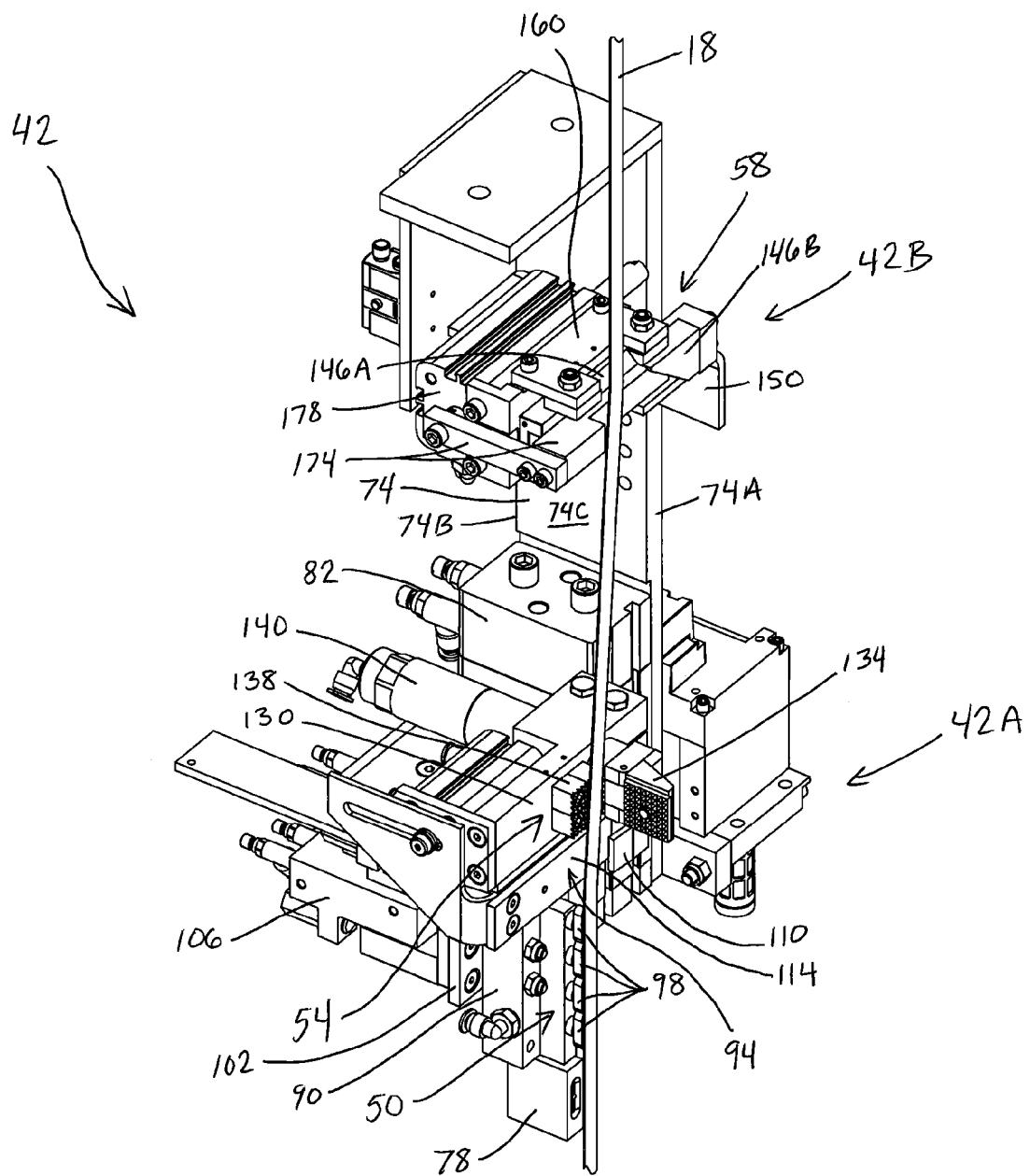

The grip assembly 50 of the end effector 42 includes a suction unit 90 for engaging a strap 18 and a flange unit 94 for further engaging the strap 18. In the illustrated embodiment, the suction unit 90 includes a set of four vacuum heads 98 coupled to a support plate 102, whereby the suction unit 90 moves between an extended position (FIG. 5B) and a retracted position (FIG. 5C). The suction unit 90 moves to the extended position to engage the strap 18 and moves to the retracted position to pull the engaged strap 18 away from the load 22. In the illustrated embodiment, a linear slide or pneumatic cylinder 106 moves the suction unit 90 between the extended and retracted positions. In the illustrated embodiment, the pneumatic cylinder 106 defines a first axis such that the support plate 102, and thereby the vacuum heads 98, move back and forth along the first axis. Referring to FIGS. 5A-5F, for the purposes of discussion, the first axis is generally parallel to an axis that passes perpendicularly through a forward edge 74A and a rearward edge 74B of the main support member 74. In the illustrated embodiment, the sensor 78 is positioned below the suction unit 90.

An example of the vacuum unit 90 and the servo motor used with the suction unit 90 is provided by Festo Corporation (Hauppauge, N.Y.). It should be readily apparent to those of skill in the art that in further embodiments, other known systems may be used to engage and/or grasp the strap 18.

The grip assembly 50 also includes the flange unit 94 for engaging the strap 18 after the strap 18 has been engaged by the suction unit 90. The flange unit 94 includes a flange member 110, a slide plate 114, and a track 118 (FIG. 6). In the illustrated embodiment, the flange unit 94 is positioned above the suction unit 90. The flange member 110 is coupled to the slide plate 114, which is slidably mounted to the track 118. The flange member 110 is generally L-shaped such that the flange member 110 extends from the slide plate 114 to form a channel 122 (FIGS. 5D and 7A) between the slide plate 114 and a free end of the flange member 110. During use, the flange member 110 engages the strap 18 by trapping the strap 18 within the channel 122.

Figure 5D:
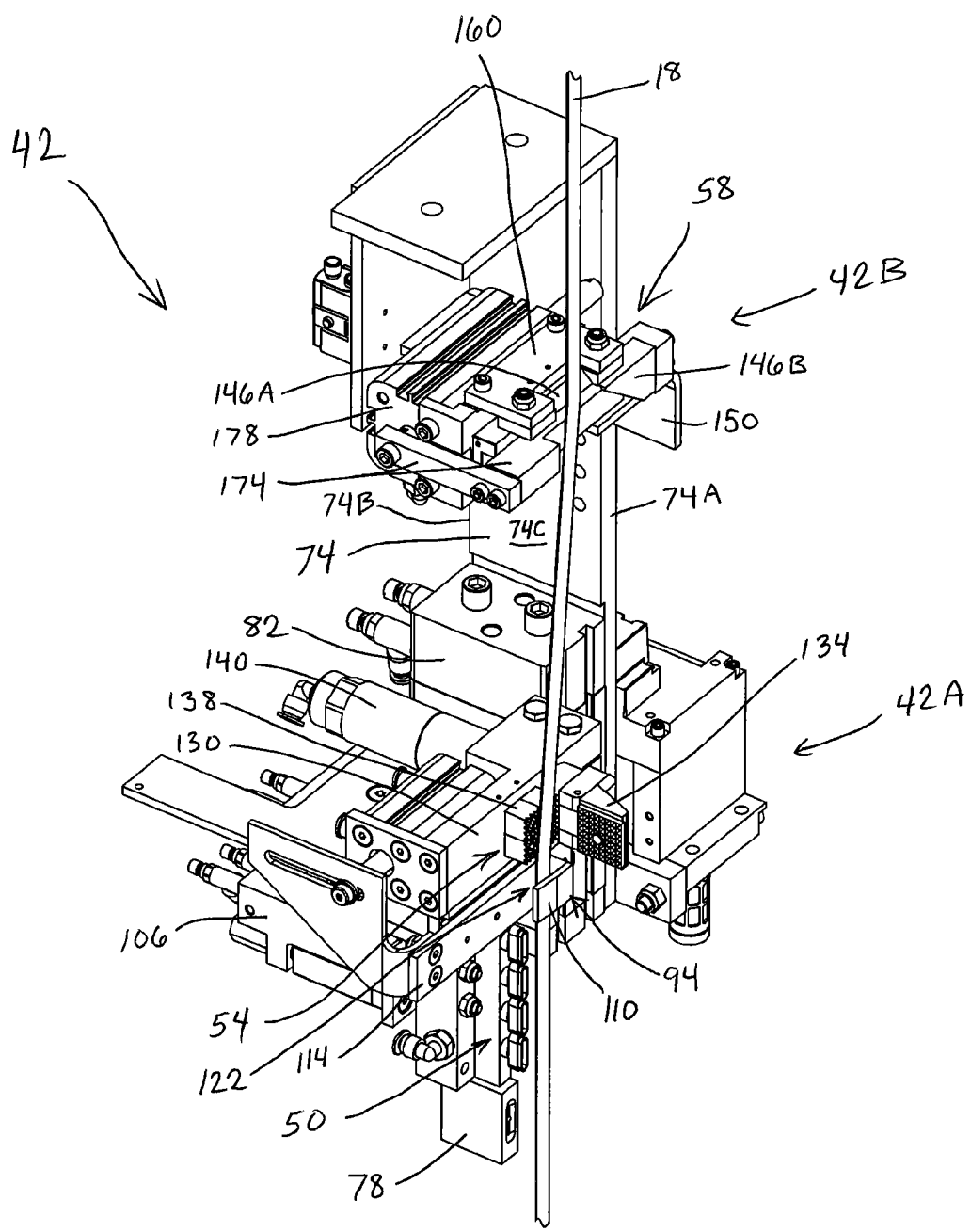

The slide plate 114 slides along the track 118 between a first, home position (FIGS. 5A-5C, 5E, and 5F) and a second, engagement position (FIG. 5D). In the home position, the flange member 110 is positioned upwardly and outwardly from the vacuum heads 98 of the suction unit 90, and in the engagement position, the flange member 110 is positioned upwardly from and generally in-line with the vacuum heads 98. In the illustrated embodiment, the slide plate 114 and flange member 110 travel along a second axis, which is generally transverse to the first axis. The second axis is generally parallel to an axis that passes transversely through side faces 74C of the main support member 74. A pneumatic actuator 126 (FIG. 6) causes movement of the slide plate 114 with respect to the track 118, although it should be readily apparent to those of skill in the art that other known actuators may be used to cause movement of the slide plate 114. In one embodiment of the invention, the flange unit 94 is used to mechanically engage or grasp the strap 18 without activation of the suction unit 90.

Figure 5E:
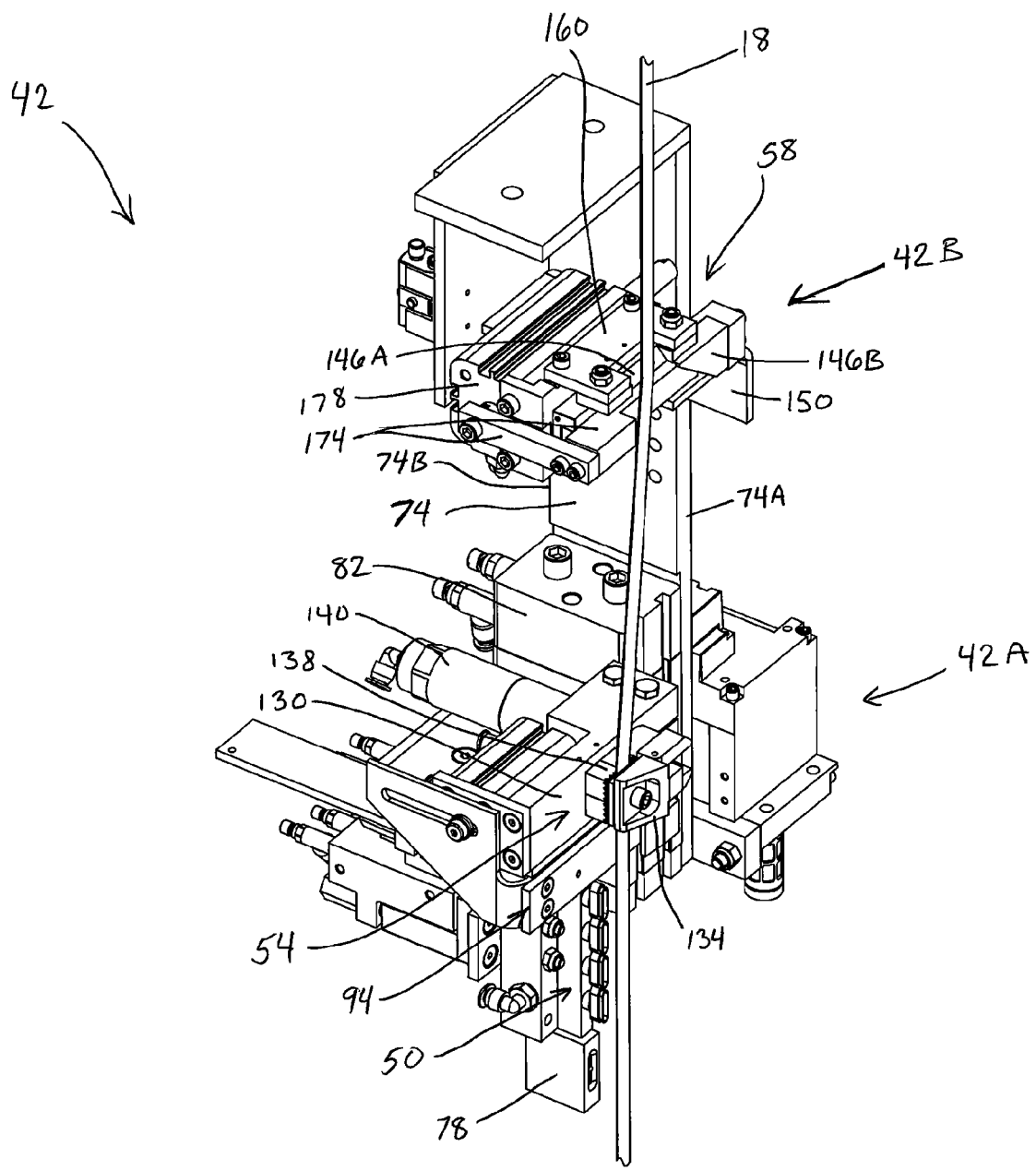
Figure 5F:
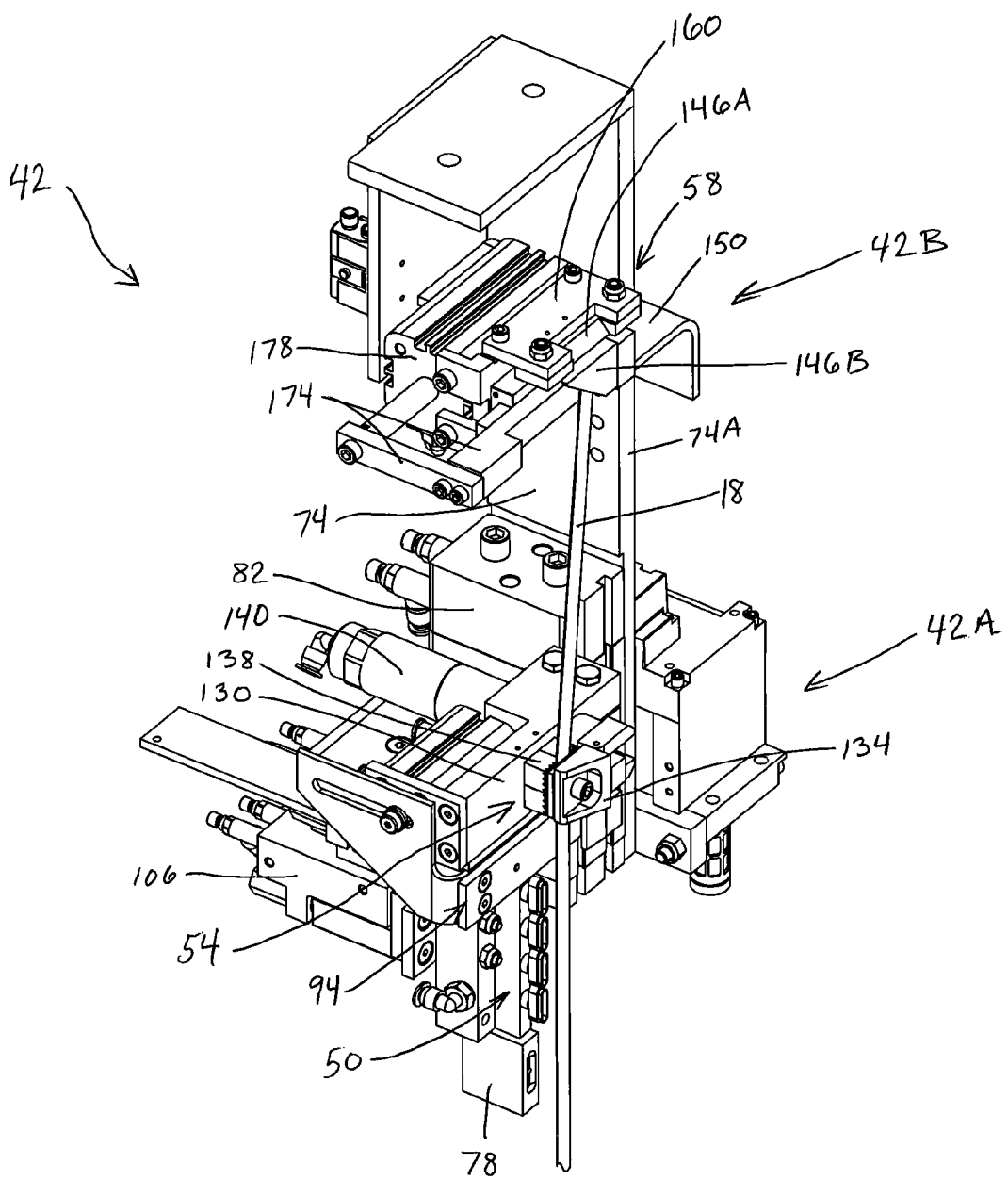
Figure 6:
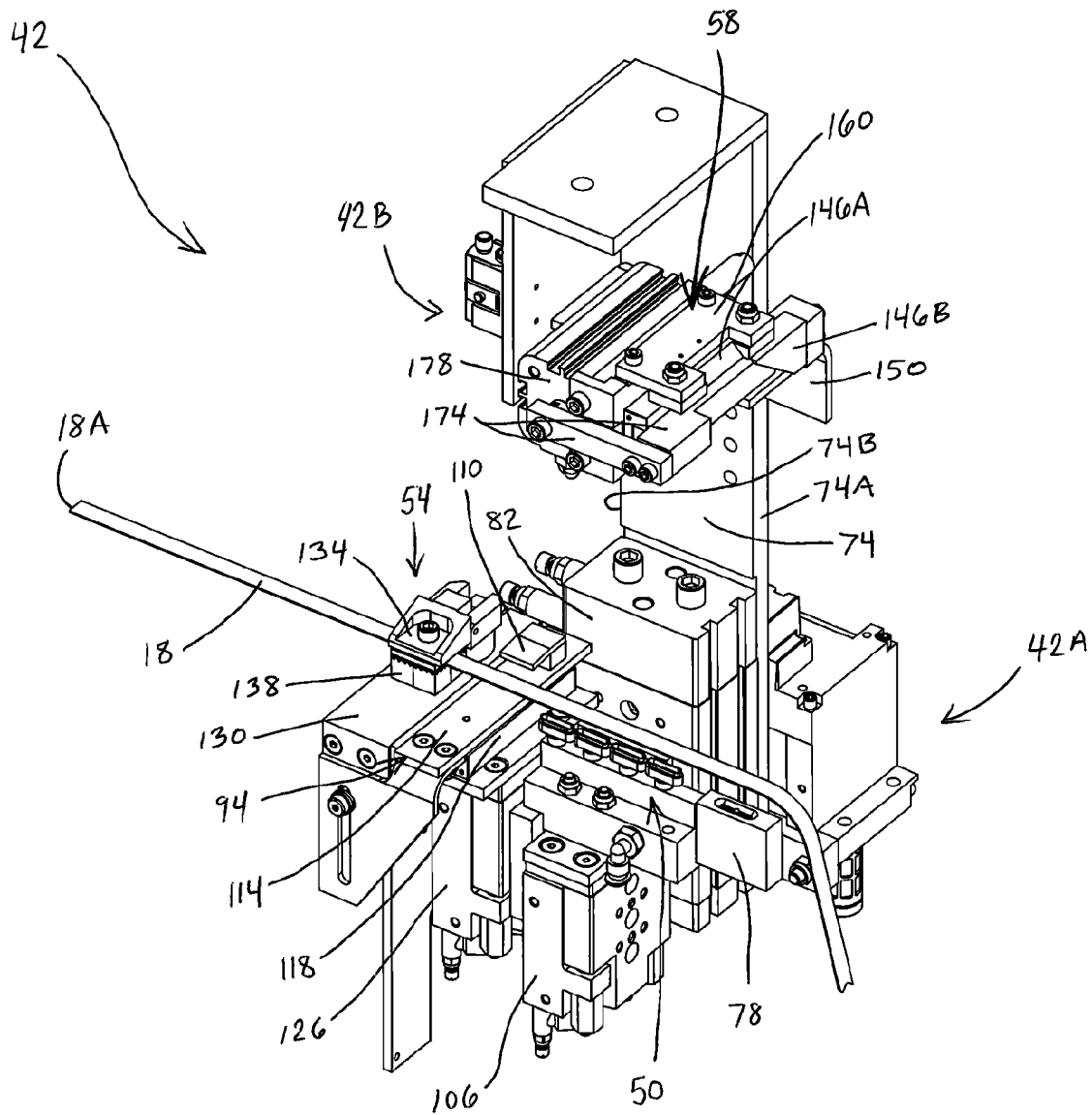
FIG. 6 illustrates the strap removal tooling of FIGS. 5A-5F with a lower portion in a rotated position to feed the strap to a disposal system.
Figure 7A:
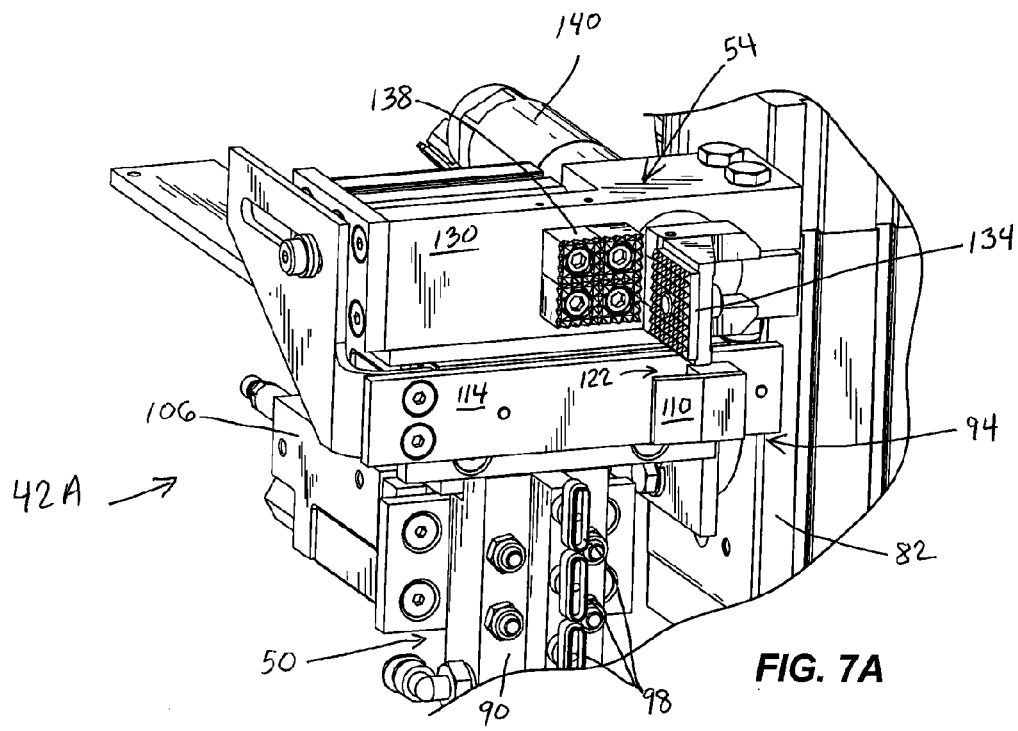
FIGS. 7A-7B illustrate the lower portion of the end effector including a grip assembly and a clamp assembly of FIG. 6 in greater detail.
Figure 7B:
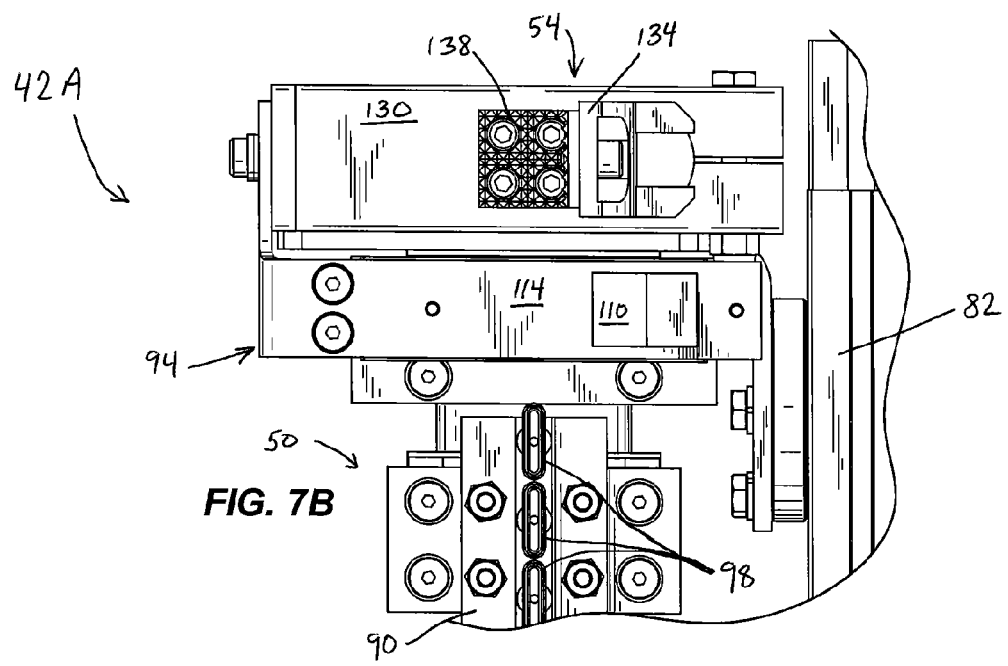

The clamp assembly 54 is positioned above the grip assembly 50, and includes a support plate 130, a clamp mechanism 134, and a clamp block 138. The clamp mechanism 134 and the clamp block 138 are coupled to the support plate 130, and positioned proximate each other. The clamp mechanism 134 is movable between an open position (FIGS. 5A-5D) and a closed, clamping position (FIGS. 5E-5F). In the closed position, the clamp mechanism 134 abuts the clamp block 138 such that a strap 18 is sandwiched therebetween and held in place by the clamp assembly 54. The flange unit 94 holds the strap 18 such that a portion of the strap 18 is positioned adjacent the clamp block 138. Thereby, upon actuating the clamp mechanism 134 to the closed position, the strap 18 is captured between the clamp mechanism 134 and the clamp block 138. In the illustrated embodiment, the clamp block 138 is formed from four blocks arranged as a square, having the same general shape as the clamp mechanism 134. In a further embodiment, fewer or more blocks may be used to form a clamp block 138 having the same or another shape. In some embodiments, the clamp surfaces of the clamp mechanism 134 and/or the clamp block 138 include a rubber or similar material.

In the illustrated embodiment, the clamp mechanism 134 is actuated between the open and closed positions by a pneumatic actuator 140, although in further embodiments, other known actuators may be used. One example of the clamp mechanism 134 used in the end effector 42 is provided by Gimatic USA (Wickliffe, Ohio).

The end effector 42 includes the upper portion 42B supporting the cutting assembly 58, which is spaced apart from the lower portion 42A. The cutting assembly 58 is vertically aligned substantially parallel to the clamp assembly 54 of the lower portion 42A. The cutting assembly 58 includes a pair of cutting members 146A, 146B. The cutting assembly 58 is coupled to the main support member 74 by a mount plate 150. In the illustrated embodiment, the first cutting member 146A is fixedly positioned between a support block 158 and a bracket plate 160.

Figure 8:
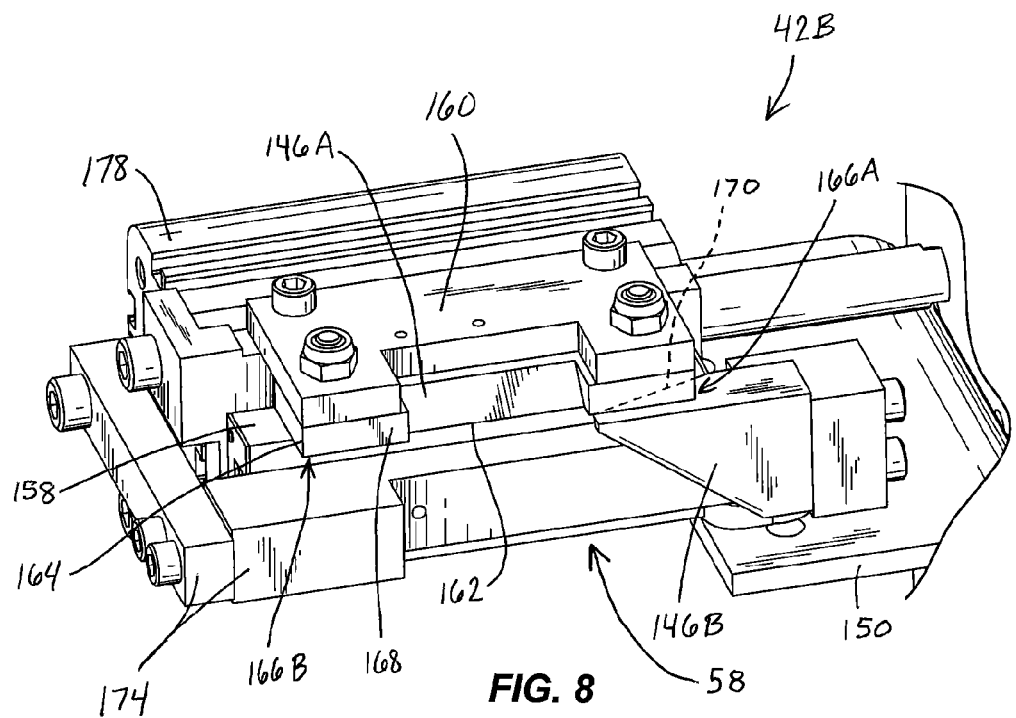
FIG. 8 illustrates an upper portion of the end effector, including a cutting assembly.

The cutting assembly 58 is shown in detail in FIG. 8. The first cutting member 146A is fixed relative to the main support member 74 and the mount plate 150. The first cutting member 146A defines a first cutting edge 162 that can be oriented substantially horizontally. The first cutting edge 162 is recessed from an outermost edge 164 of the first cutting member 146A. The first cutting member 146A includes a first end 166A and a second end 166B. As shown in FIG. 8, an abutment or stop member 168 extends past the first cutting edge 162 (in a direction towards the load 22 when the end effector 42 is positioned for operation on a strap 18) on the second end 166B of the first cutting member 146A. The stop member 168 prevents sideways movement of the strap 18 as the second cutting member 146B moves along the first cutting member 146A from the first end 166A towards the second end 166B during cutting. Thus, the strap 18 is retained against the first cutting edge 162 and is prevented from sliding off of the first cutting member 146A.

The second cutting member 146B is coupled to the mount plate 150 for slidable movement with respect to the mount plate 150 and the first cutting member 146A. The second cutting member 146B can be angled with respect to the first cutting member 146A to define a cutting nip therebetween. In one embodiment, the second cutting member 146B defines a second cutting edge 170 oriented at a fixed angle of between about 0 degrees and about 90 degrees with the first cutting edge 162 of the first cutting member 146A. The second cutting member 146B is slidable between a first position (FIGS. 5A-5E) adjacent the first end 166A of the first cutting member 146A and a second position (FIG. 5F) adjacent the second end 166B of the first cutting member 146A. In the illustrated embodiment, the second cutting member 146B is coupled to a carriage 174 movable by a pneumatic actuator 178, although those skilled in the art will realize that alternate arrangements and/or actuators may be suitable.

Figure 9:
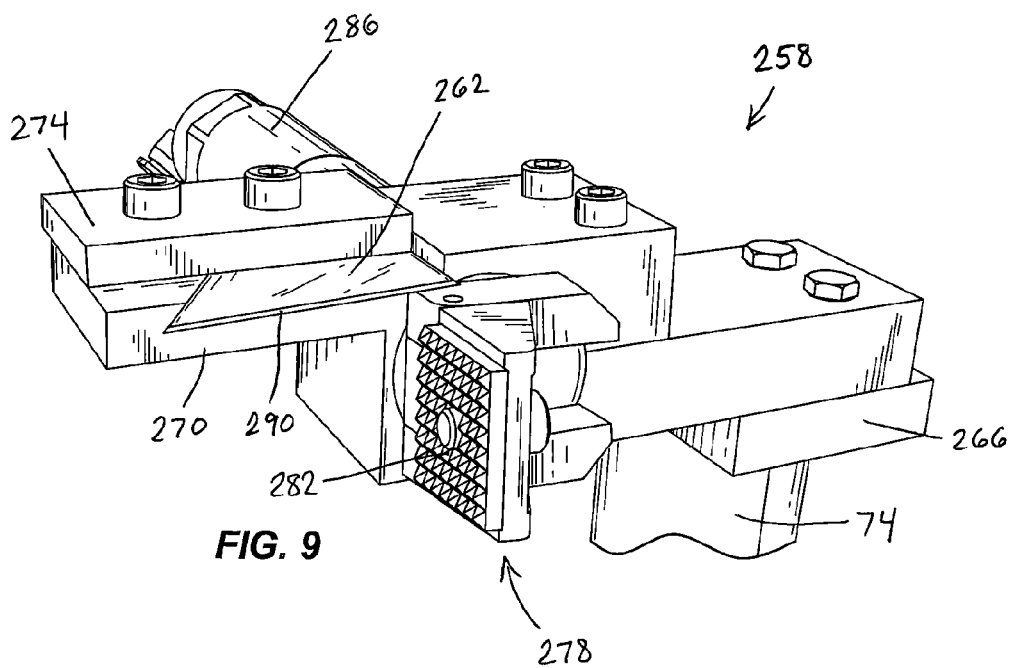
FIG. 9 illustrates an alternate cutting assembly for use with the end effector and strap removal system according to one embodiment of the invention.

FIG. 9 illustrates a cutting assembly 258 according to another embodiment of the invention. The cutting assembly 258 includes a single cutting member 262 such as a razor blade in the illustrated embodiment, although other types of blades are optional. The cutting assembly 258 is coupled to the main support member 74 by a mount plate 266, which supports a support block 270. The cutting member 262 is fixedly positioned against the support block 270 by a bracket plate 274. A clamp assembly 278 is positioned adjacent the cutting member 262 and is operable between an open position (FIG. 9) and a closed position. The clamp assembly 278 may include a single clamp mechanism 282 actuable by a pneumatic actuator 286, although other arrangements and actuators are optional. When a strap 18 is positioned adjacent the cutting member 262, the clamp assembly 278 is closed, whereby the clamp mechanism 282 presses the strap 18 against the cutting member 262 to sever the strap 18. Although illustrated with the clamp assembly 278 positioned below the cutting member 262, the orientation may be reversed. As illustrated in FIG. 9, the cutting member 262 includes a cutting edge 290 that is angled slightly towards the clamp mechanism 282, whereby the strap 18 is less likely to slide off the cutting member 262.

During operation, the strap removal system 10 locates and removes the straps 18 from the load 22 for disposal. In one embodiment, the system 10 locates a strap 18, engages and clamps the strap 18, then cuts the strap 18 and transports the strap 18 to the disposal system 38. The arm robot 46 maneuvers the end effector 42 about the load 22 while the sensor 78 locates a strap 18 wrapped about the load 22. Referring to FIGS. 1-3, the end effector 42 is positioned to a side of the load 22 such that the end effector 42 operates on a side of the load 22. A side location of the end effector 42 eliminates height restrictions for the load 22 and the strap removal system 10 dictated by the conveyor system 14. Once a strap 18 is identified by the sensor 78, the arm robot 46 orients the end effector 42 to a home position. In the home position, a forward face of the end effector 42 faces the load 22 and the lower portion 42A is rotated to a first position (FIGS. 5A-5F). Further, in the home position, the suction unit 90 of the grip assembly 50 is in the extended position (FIG. 5B), the flange unit 94 is in the home position (FIGS. 5A-5C, 5E, and 5F), and the clamp mechanism 134 of the clamp assembly 54 is in the open position (FIGS. 5A-5D).

The arm robot 46 moves the end effector 42 towards the load 22 while the vacuum heads 98 of the suction unit 90 are actuated. As the end effector 42 approaches a strap 18, the vacuum heads 98 engage the strap 18. In a preferred embodiment, the suction unit 90 engages the strap 18 at or above the joint 66 in the strap 18, when the end effector 42 is located on the same side of the load 22 as the joint 66, or at any point along the strap 18 when the end effector 42 is located on a side of the load 22 not including the joint 66. Once the suction unit 90 engages the strap 18, the suction unit 90 moves to the retracted position, i.e., away from the load 22, and pulls the strap 18 away from the load 22, as shown in FIG. 5C. The flange unit 94 then slides to the engagement position, as shown in FIG. 5D, such that the strap 18 is trapped within the channel 122 between the flange member 110 and the slide plate 114. Once the strap 18 is mechanically held in place by the flange unit 94, the vacuum heads 98 of the suction unit 90 are de-activated to thereby release the strap 18.

At this point, a portion of the strap 18 should be positioned proximate the clamp block 138 of the clamp assembly 54 and the recessed cutting edge 162 of the first cutting member 146A. Next, the clamp mechanism 134 of the clamp assembly 54 is actuated to move from the open position to the closed position such that the strap 18 is mechanically retained or gripped, as shown in FIG. 5E. The captured portion of the strap 18 defines a grip point. After the strap 18 is clamped by the clamp mechanism 134, the flange unit 94 slides back to the home position and releases the strap 18. To cut the strap, the second cutting member 146B slides from the first position to the second position along the first cutting member 146A as shown in FIG. 5F. The stop member 168 prevents localized movement of the strap 18, and the strap 18 is severed by the nip defined by the respective cutting edges 162, 170 of the first and second cutting members 146A, 146B. After the cut is made, the captured portion of the strap 18 remains clamped by the clamp mechanism 134, and the portion of the strap 18 above the cut is released from the end effector 42.

Next, the lower portion 42A of the end effector 42 is rotated approximately 90 degrees to a second position to orient the captured portion of the strap 18 for feeding to the disposal system 38, as shown in FIG. 6. It should be readily apparent to those of skill in the art that in further embodiments the lower portion 42A may not be rotated or may be rotated to a different angle or direction to facilitate feeding of the strap 18. The robot arm 46 moves the end effector 42 to the disposal system 38 to dispose of the strap 18. The captured portion of the strap 18 is fed to the disposal system 38 by the end effector 42. Simultaneously, the clamp mechanism 134 of the clamp assembly 54 is actuated to the open position such that the strap 18 may be fed to the disposal system 38. The lower portion 42A of the end effector 42 then rotates back to the first position and the robot arm 46 moves the end effector 42 back to the load 22 to initiate the strap removal cycle again on another strap 18.

If the strap 18 is cut on a side of the load 22 on which the joint 66 is located, the strap 18 is cut just above the joint 66 so that the joint 66 is the first portion of the strap 18 fed away from the load 22. If the strap 18 is cut on a side of the load on which the joint 66 is not located, the strap 18 is fed away from the load 22 such that the tail 70 follows the joint 66 and is very unlikely to become caught or entangled on the load 22 or other straps 18. Thus, the strap removal system 10 can operate without the need to locate an outermost strap 18 on the load 22. This simplifies the process in that the strap removal system 10 can cut the straps 18 from the load 22 in the order in which they are located. The strap removal system 10 may begin the removal process on a first side of the load 22, removing all straps 18 extending along the first side of the load 22, and then complete the removal process by removing all straps 18 extending along an adjacent side of the load 22.

The end effector relates to a strap removal system for automatically removing straps from a palletized load and disposing of the straps, for example, to a disposal system or a holding container. The present invention strap removal system is adaptable to be used with loads of varying heights. The end effector is positioned adjacent a side of the conveyor system such that the end effector works from a side of the load rather than a top of the load. The articulated arm robot moves the end effector to various positions about the load to perform the strap removal process. The strap removal system identifies a position of a strap, engages the strap, clamps the strap, cuts the strap and then transports the strap to a disposal system. Further, the clamp assembly is configured on the end effector to hold the strap at a grip point, proximate a cut point, such that the strap is removed from the load without a tail of the strap becoming caught and/or causing damage to the load. When operating on a side of the load on which there is a joint and a tail in the strap, the strap is cut above the joint.

Although particular embodiments of the present invention have been shown and described, other alternative embodiments will be apparent to those skilled in the art and are within the intended scope of the present invention. The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention.

What is claimed is:

1. A method of removing straps from a load on a conveyor, the method comprising:
   providing an end effector to a side of the conveyor, the end effector including a main support member that supports a suction assembly, a clamping assembly, and a cutting assembly;
   moving the end effector adjacent a first vertical side of the load;
   detecting a first strap while moving the end effector across the first vertical side of the load;
   engaging the first strap by:
      moving the suction assembly relative to the clamping assembly,
      contacting an outwardly facing surface of the first strap with the suction assembly, and
      pulling the first strap to a pulled-away position without contacting an inwardly facing surface of the first strap;
   retaining the first strap in the pulled-away position;
   clamping the retained first strap using the clamping assembly;
   cutting the clamped first strap at a cut point on the first strap using the cutting assembly; and
   removing the first strap from the load.

2. The method of claim 1, and further comprising detecting one or more additional straps along the first vertical side of the load, and in turn, engaging the additional straps, pulling the additional straps away from the first vertical side of the load while engaged, cutting the additional straps, and removing the additional straps from the load.

3. The method of claim 1, and further comprising moving the end effector adjacent a second vertical side of the load, detecting a second strap while moving the end effector across the second vertical side of the load, engaging the second strap, pulling the second strap away from the second vertical side of the load while engaged, cutting the second strap, and removing the second strap from the load.

4. The method of claim 1, wherein the first strap includes a weld joint along the first vertical side of the load, and cutting the first strap includes severing the first strap above the weld joint.

5. The method of claim 1, and further comprising clamping the first strap with a clamp mechanism at a grip point of the first strap that is below the cut point of the first strap.

6. The method of claim 5, and further comprising holding the first strap in the clamp mechanism after cutting is completed, and feeding a lower cut edge of the first strap, located directly below the cut point, into a disposal system.

7. The method of claim 6, wherein feeding the lower cut edge of the first strap into a disposal system includes moving the end effector towards the disposal system and rotating the clamp mechanism and the lower cut edge away from the load.

8. The method of claim 1, wherein the suction assembly comprises a plurality of vacuum heads.

9. The method of claim 8, and further comprising releasing the first strap from the suction assembly prior to cutting the first strap.

10. The method of claim 1, wherein the first strap is the first strap detected on the load, and the first strap is the first strap cut regardless of its position relative to one or more additional straps on the load.

11. The method of claim 1, wherein cutting the first strap includes moving at least one movable cutting member relative to the first strap.

12. A method of removing a strap from a load on a conveyor, the method comprising:
provideing an end effector to a side of the conveyor;
moving the end effector adjacent a first vertical side of the load;
detecting the strap while moving the end effector across the first vertical side of the load;
engaging the strap by moving a suction assembly along a first axis to engage an outwardly facing surface of the strap without contacting an inwardly facing surface of the strap;
pulling the strap to a pulled-away position away from the first vertical side of the load;
retaining the strap in the pulled-away position by moving an engagement assembly along a second axis that is substantially perpendicular to the first axis to position at least a portion of the engagement assembly between the strap and the first vertical side;
securing the retained strap using a clamping assembly;
cutting the secured strap at a cut point on the strap; and
removing the strap from the load.

13. The method of claim 12, wherein the engagement assembly is a flange assembly.

14. The method of claim 13, further comprising the step of disposing of the strap.

15. The method of claim 14, wherein the disposing step comprises feeding the strap into a disposal system.

16. The method of claim 15, wherein a lower portion of the end effector is rotated to facilitate feeding the strap into the disposal system.

17. A method of removing a strap from a load on a conveyor, the method comprising:
providing an end effector to a side of the conveyor, the end effector supporting a suction assembly, a flange assembly, and a clamping assembly on a lower portion and supporting a cutting assembly on an upper portion;
moving the end effector adjacent a first vertical side of the load;
detecting the strap while moving the end effector across the first vertical side of the load;
engaging the strap by extending the suction assembly along a first axis beyond the flange assembly, the clamp assembly, and the cutting assembly to contact an outwardly facing surface of the first strap without contacting an inwardly facing surface of the strap;
pulling the strap away from the first vertical side of the load to a pulled-away position by retracting the suction assembly along the first axis;
retaining the strap in the pulled-away position by moving the flange assembly along a second axis that is substantially perpendicular to the first axis so that at least a portion of the flange assembly is positioned between the strap and the first vertical side;
securing the retained strap using a clamping assembly;
cutting the secured strap at a cut point on the strap; and
rotating the lower portion of the end effector relative to the upper portion to facilitate removal of the strap from the load.

18. The method of claim 17, wherein the lower portion of the end effector is rotated about 90°.

* * * * *